April 4, 1967 C. M. BERGENER 3,311,996
STAIRSTEP DEVICE FOR TEACHING NUMBERS
Filed Oct. 19, 1964 2 Sheets-Sheet 2
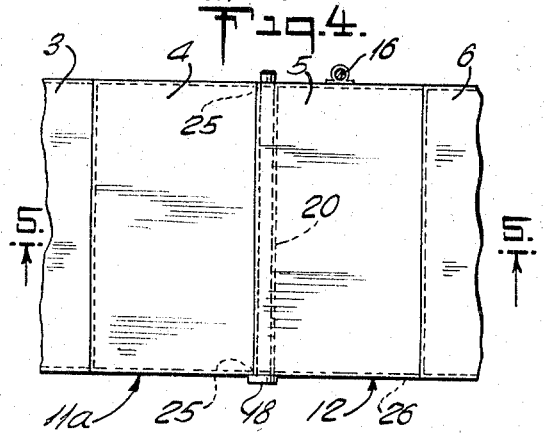
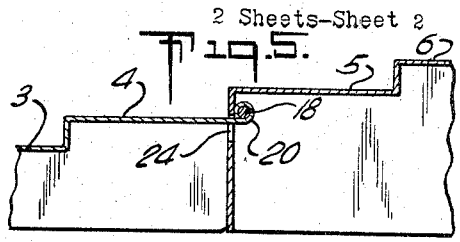
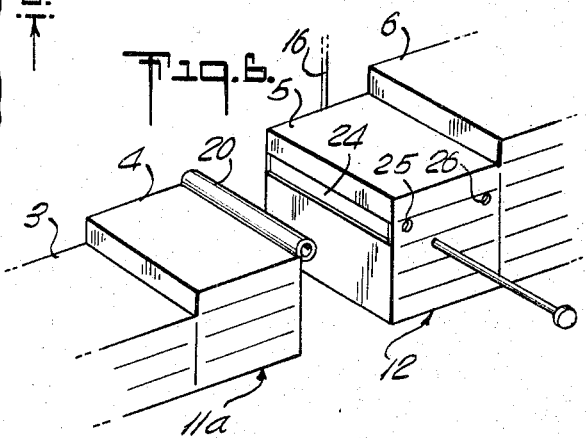
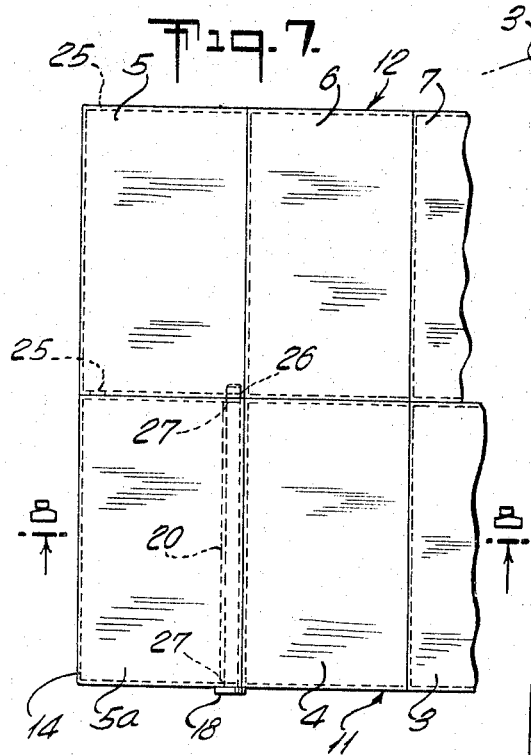
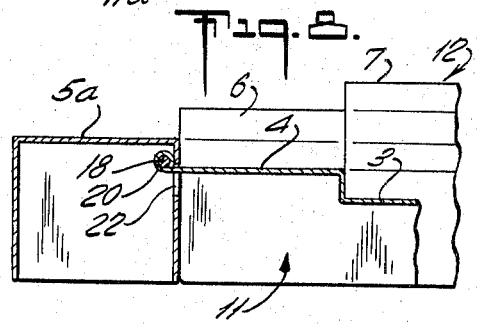
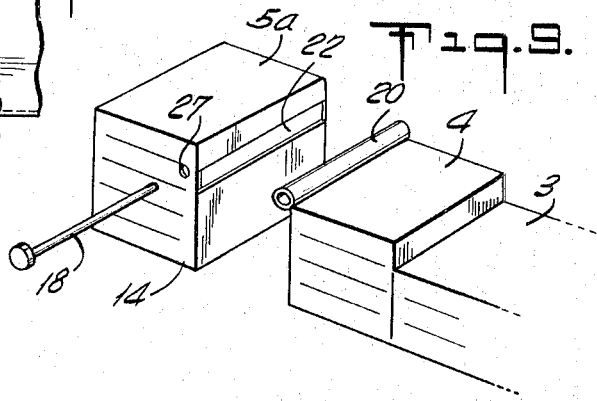
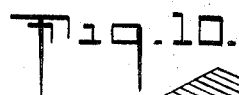
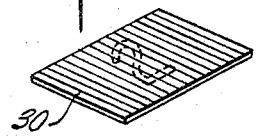
INVENTOR
CAROL M. BERGENER
BY Nolte & Nolte
ATTORNEYS though various color coded steps at the same time that he is numbering them.

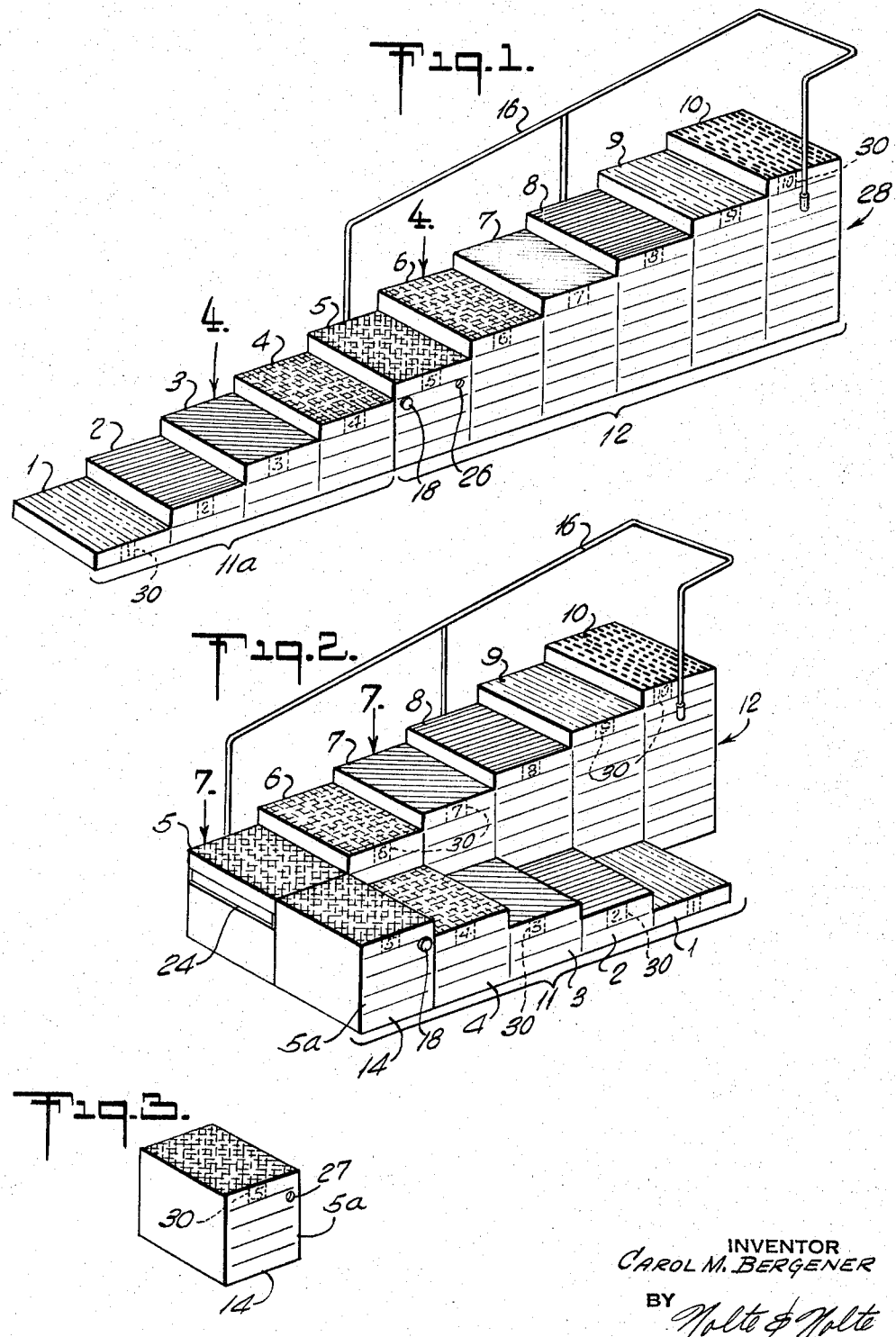

United States Patent Office 3,311,996
Patented Apr. 4, 1967

3,311,996
STAIRSTEP DEVICE FOR TEACHING NUMBERS
Carol M. Bergener, 15 Douglas Place, Eastchester, N.Y. 10709
Filed Oct. 19, 1964, Ser. No. 404,791
6 Claims. (Cl. 35—31)

The present invention relates to teaching devices in general, and in particular, to improvements in devices for new ways of teaching the theory of numbers to a young child.

While there are a variety of instructional aids available for the so-called teaching of "new math," such as: magnetic discs, beads, colored rods, ten frames, counting men, etc.; these aids are only manipulative devices that help reinforce number concepts as they are being taught. While these prior art devices are helpful, the present invention provides novel means in the form of a series of low rise steps which are color coded and may be employed by the teacher to create an entirely new learning environment. The new learing environment created by the invention permits, and requires, that the child physically and bodily participate in the learning process. The child discovers and he explores on his own. He is not told how to do it, where it becomes mere memorization, but rather, he discovers for and by himself, by his own bodily movements, these new ideas, number patterns and relationships.

Accordingly it is a principal object of the present invention to provide a novel means and method for teaching the logical structure of numbers and mathematics wherein the young child is exposed to meaningful experiences upon a flight of steps.

Another object of the invention is to provide a novel structure of ten steps wherein these steps may be arranged in a single ascending straight line, or may in the alternative be arranged to make a 180° turn on the middle or No. 5 step level.

A further object of the invention is to provide a novel arrangement of number teaching steps wherein the various steps are visually identified and correlated by way of appropriate color identification.

These and other objects and advantages of the invention will become apparent and the invention will be fully understood from the following description and drawings in which:

FIG. 1 is a perspective view of the invention wherein the number teaching steps are arranged in a straight line ascending pattern;

FIG. 2 is a perspective view of the invention showing an alternate arrangement of the steps of FIG. 1 wherein they follow a 180° turn;

FIG. 3 is a perspective view of a removable step portion comprising an end of the first section of steps;

FIG. 4 is a top plan view taken on the direction of the arrows 4—4 in FIG. 1;

FIG. 5 is a cross sectional view taken along line 5—5 of FIG. 4;

FIG. 6 is an exploded perspective view showing the manner in which the first and second sections of the stairs are held together;

FIG. 7 is a top plan view of the invention as arranged in FIG. 2 looking in the direction of the arrows 7—7;

FIG. 8 is a fragmentary cross sectional view taken along lines 8—8 of FIG. 7;

FIG. 9 is an exploded perspective view of the removable 5th step at the end of the first section of stairs; and FIG. 10 is a perspective view of a typical removable colored stair tread which may be placed either on the horizontal surface of the stair, or the vertical portion adjacent thereto, as desired, when numerical identification of the steps is also employed in teaching the child.

Referring to the drawings in particular, the invention as embodied in FIGS. 1, 4, 5 and 6 show the two sections of the stairs as they would be arranged in a straight line fashion. The series of ten steps includes a first section designated 11a which is secured by a pin 18 to a second section designated 12. The second section of the steps is provided with a suitable guard rail shown typically at 16 for safety purposes.

Referring to FIGS. 4, 5 and 6, the manner in which the first section of stairs 11a is secured by the pin 18 to the second section of steps 12 is shown in detail. The forward edge of the fourth step of the first section 11a is provided with a tubular sleeve 20 which is adaptable to freely enter a corresponding slot 24 (see FIG. 6) formed in the end wall of the lowest step in the second section 12 of the stairs. Upon insertion of the sleeve 20 through the slot 24, the pin 18 is inserted through the aperture 25, through the sleeve 20, to engage a corresponding aperture 25 on the opposite side of the second stair section.

In one example of the invention, each step is made approximately ten inches by eighteen inches with the height of the riser between steps approximately one and one quarter inches. The series of ten steps, in combination have a total length of approximately five feet and a height at the highest end of approximately seventeen and one half inches.

On the vertical side of each section a unit pattern is indicated generally at 28 so that the child when observing these sides can readily determine that each step of increased height constitutes an increase of one unit above the number of units comprising the height of the adjacent lower step.

In the example shown in FIG. 1, the flight of steps includes ten different levels and for simplicity in designation the first step has been designated as element 1, the second step designated as element 2, the third step is designated as element 3 and so on, numerically upward to the topmost step or tenth step which is designated 10. Each step has its upper surface painted or otherwise identified by a suitable color in contrast to the color of its adjacent step. In the example shown, the 10th step is violet, the 9th and 1st steps are indigo, the 8th and 2nd steps are blue, the seventh and third steps are green, the sixth and fourth steps are yellow, and the 5th step is orange. Preferably the graph pattern 28 on the vertical sides of the step is in red to make it readily apparent to the child.

For some of the teaching activities the two sections 11a and 12 of FIG. 1 are used and arranged in accordance with the layout shown in FIGS. 2, 3, 7, 8 and 9. In FIG. 2 the first section 11a of FIG. 1 has been separated from the second section 12 of FIG. 1 and lengthened to the five step section designated 11 by the addition of an extra fifth step 14. Element 14 corresponds in horizontal level to step 5 in FIG. 1 and its top surface for simplicity has been designated as 5a. Referring to FIGS. 7, 8 and 9, the manner in which the additional 5th step 14 is added to the section 11a is shown. The securing pin 18 previously employed in maintaining the two sections of FIG. 1 together is now used in a similar manner to secure the additional block 14 to section 11a. The sleeve 20 is inserted through a slot 22 and the pin 18 introduced therethrough. Thereafter the lengthened first section of steps 11 is placed in a parallel relationship to the second stair section 12 in the manner indicated. The projecting end of the securing pin 18 enters an aperture 26 in alignment therewith so that the first section 11 may be moved into close abutting relationship with the second section 12. (See FIGS. 6 and 7.) With this arrangement of the lengthened first section 11 relative to the section 12, the two units are paired with each other in a manner so that the steps of one section will be of the same color as its corresponding parallel step of the other section. Furthermore by counting the number of blocks, or units, between the level of any one step and its adjacent step defined by the red graphing lines 28, the number which must be added to the lower step to obtain the number of the upper step may be readily apparent.

In FIG. 10, a typical step marking indicia is shown. In the example illustrated the numeral 2 appears on the face of the step. The marking indicia 30 may be in the form of a removable colored stair tread which may be applied to the horizontal surface of its respectively colored step or if desired may be applied to the vertical side of its respective step (as shown). It should be understood that it will not in most cases be desirable to actually number each of the steps, but the invention, under certain conditions of instruction will be provided with a plurality of marking indicia such as elements 30 shown in FIG. 10 applied to each of the respective steps so that the child will associate the visual appearance of the actual number with the respective step in the flight of stairs. The pads are to be made of an inexpensive material such as thin vinyl, plastic, or pressed paper. These can be either supplied as additional materials in a kit, or instructions are given in the manual for teachers to use regular classroom supplies.

Since the basic principle of the invention is to have the child discover, explore and perhaps create new number ideas, patterns and relations, the structure purposely eliminates anything that will confine his thinking powers. That is the reason for having removable pads 30, in this way the child will be free to think flexibly, and reason out association of ideas that are perhaps beyond any that we as adults can now imagine.

One example of the invention has been constructed of ¾ inch plywood with a tubular hand rail 16 mounted on section 12 and no permanent numbers are affixed to the steps. However, for certain teaching activities removable pads 30 will be placed on the steps (or on the step sides as shown) during the lesson or instruction. These pads may have the natural order of numbers 1 through 10 (one set of pads) and 0, −1, −2, −3, −4, −5 (one set of pads).

While the invention has been illustrated as being formed from rigid sheet metal, one preferred embodiment has been constructed of wood, and those skilled in the art will readily appreciate that alternate suitable materials such as fiber glass may be employed without departing from the scope of the invention.

With the foregoing explanation of the structural arrangement of the invention, the following is a brief description of various manners in which it would be used in the instruction of a child in modern math techniques.

The most effective method of teaching modern math is the discovery method. Young children learn by doing and acting out. If they can experience an action, they can explore many possible approaches and see relations between ideas.

With the young child, the teacher is always seeking a variety of experiences to make him more aware of the world about him. A set of stairs is an experience that is familiar to every child. This then became the kinesthetic approach of using the invention in teaching the basic structure of the New Math.

At kindergarten level, the present invention is used as a non-directed play equipment so that the five-year old may discover the natural order of numbers and begin to see patterns and relationships. He will be curious of the colors on the respective steps and wonder why certain ones are side by side. Some days the teacher can use the two sections of steps as one continuous staircase. Other times when she sees the childrens' interest aroused she can use them as separate units side-by-side. Used in this manner, the children are motivated to discover for themselves thus laying the foundations for future learning.

At the first grade level of the "one-more" concept is one of the basic structures the child first learns. The teacher takes the first section of steps and slowly guides the child to discover and explore for himself. The child approaches the stairs and before he can begin to climb he finds himself at a starting point called zero (the plane of the classroom floor). As he climbs up one step, he experiences the upward movement and is now ready to verbalize what he has acted out. If he starts at the zero and moves up one he lands on step #1. What must he do to get back where he started? The child will answer: he must go down one to get back to the starting point. In Mathematical language he learns to transpose this later to notation form, thus:

$$0+1=1 \text{ and } 1-1=0$$

This is the way the order of numbers is gradually built up from 0 to 10 so that the child can understand the "why" of the structure of our number system. Now what must he do if he is on step one and wants to get to the next step? He will answer and tell you he must go up one more. Can we have step 2 before we have step one? No. Any child can act this one out and see that it is impossible to have two before you first have one. Thus, the child is slowly discovering for himself what makes up the natural order of numbers. And more than that, he begins to see: 1+1 is another name for 2.

We are now laying the foundation for greater flexibility in thinking so that the child can develop his own powers of reasoning and retention. He begins to see the pattern he has already established and he proceeds on his own, verbalizing as he acts it out. If I am on step 2 and want to get to the next one I must go up one more in order to land on step 3 so 3 is 2+1. The child now has learned to relate other ideas to the same action and begins to use the new symbol.

Step by step the teacher guides the child to make his own discoveries, who, by now, will have a feeling for the natural order of numbers. He will tell you when he is on step 3 he will move up one more to get to the next step 4. The teacher is not surprised if someone comes up with a new discovery, that: 2+2 is 4.

At step 5 the teacher opens up other doorways for the child to explore. As the child becomes aware of the one-more concept, he begins to order numbers, and as he does so he concludes that in ascending each new number is "one more" than the number which precedes it; and in descending each number is one less than the number which succeeds it. Thus, he has now developed an ability to compare two numbers. He can say that step 4 is more than step 3, but step 4 is less than step 5. Various oral directions can now be given, such as:

Show the step that is one less than four.
Show the step that is one more than two.
Show two plus one.
Show the step that comes between one and three.

As the child is ready to go beyond 5 the second section is aligned with the first so as to continue with the development of all the steps up to ten. The child now is secure in verbalizing the one more pattern and he is ready now to discover new relationships. He sees the invention in a new arrangement and observes the two five-steps are the same color and height. Let him explore the "why" so that he can be stimulated to think of them as pairs of disjoint sets contained within the given set of stairs, or our base ten system of numbers.

As he proceeds to step six he looks down and sees step four is the same color, but it is 2 spaces below the 6. He now is ready to formalize what he has acted out: That 6 is 5+1, and also 6 is 4+2.

The teacher now introduces three important concepts: (a) the idea of union of sets, (b) the idea of addition;

and (c) the written form of the Math sentence—the equation.

On step 7 he pairs it with the 3, as he examines it he will verbalize that 7 is 6+1 and also 3+4.

On step 8 he pairs it with the 2, and verbalizes that 8 is 7+1 and also 8 is 2+6.

On step 9 he pairs it with the 1 and verbalizes that 9 is 8+1, and as he sees it in relation to 5 he will say 9 is also 5+4. The child develops confidence in himself and extends his understanding of numbers to other combinations. It is this association of ideas that makes it possible for the child to have a broad horizontal view of the structure of numbers. He has the key that will open up doorways to limitless avenues of approach. The invention, kinesthetically gives him the key to unlock some of the wonders of the world about him.

As the child leaves step 9 and takes one more step he reaches the last number in the basic counting sequence which is called Ten. He verbalizes that Ten is 9+1, and all the other paired combinations. As he stands on 10 he finds he has no partner step below him but only the empty floor which is zero. The teacher now guides him on the threshold of another basic structure of numbers and that is the concept of Place Value. The child now verbalizes Ten means one "ten" and "zero" ones.

The structure of the invention can be used to introduce the concept of the missing addend which indirectly leads to subtraction. The child can now understand the "why" of subtraction being the inverse of addition. He reasons if I'm on step 1 and want to get to 3, what must I do? He sees he must move forward 2 or in notation form 1+2=3. Now he says if I'm on step 3 and I want to get back to one what must I do? He acts it out by going back to step one and finds he moved down 2 steps or in notation form: 3−2=1. The child is exposed to this inverse relationship at the first step as he learns to think flexibly about numbers.

At the second grade level the aforementioned concepts can be reinforced in the first six weeks of school and then extended to partition of numbers or division. As he sees the relationship of each step as part of the whole set of stairs he verbalizes thus:

1/10 of 10=1           6/10 of 10=6
2/10 of 10=2           7/10 of 10=7
3/10 of 10=3           8/10 of 10=8
4/10 of 10=4           9/10 of 10=9
5/10 of 10=5           10/10 of 10=10

Here once again he sees the natural order of numbers. He begins to explore other patterns. He discovers that since there are two "fives" in the staircase: 10, then the inverse of that is true—using his former knowledge that subtraction is the inverse of addition. He learns in second grade that multiplication is repeated addition and division is repeated subtraction. Thus he reasons he must do the same for these new operations as he did in his basic structure of addition.

He acts out on the number stairs:

1/5 of 10=2
2/5 of 10=4
3/5 of 10=6
4/5 of 10=8
5/5 of 10=10

He can now go beyond:

6/5 of 10=12
7/5 of 10=14, etc.

At third grade level, all of the first basic concepts previously taught are reinforced the first six weeks. Then the child can explore how many varied patterns he can form by using every other number. (For this activity a removable pad with its number is placed on each step.) One of the patterns formed is:

| 5 and 4 | 6 and 3 | 7 and 2 | 8 and 1 |
|---------|---------|---------|---------|
| 9       | 9       | 9       | 9       |
| 7+4     | 8+3     | 9+2     | 10+1    |
| 11      | 11      | 11      | 11      |

While two specific embodiments of the invention have been shown and described in detail to illustrate the application of the inventive principles, it will be understood that the invention may be embodied and employed otherwise in the teaching of mathematics and number concept to children without departing from these inventive principles.

What I claim is:

1. A teaching device comprising a plurality of joined ascending steps of uniform incremental unit height of from one to ten units said plurality of steps being subdivided into at least two main sections, a suitable removable securing means being provided to connect said two main sections so as to arrange said plurality of steps in a linear alignment, or in a side by side arrangement wherein one main section is arranged in opposite direction of the other main section, each of said adjacent steps being identified with suitable contrasting chromatic indicia, and being sufficiently large and sturdy so that a lower grade school child may position himself on respective steps corresponding in height to their number in the series of steps.

2. A teaching device in accordance with claim 1, wherein said steps include a plurality of horizontally disposed indicia lines upon the vertical sides thereof to visually divide the vertical height of each step into a plurality of unit heights corresponding in number to each step's position in said device.

3. A teaching device in accordance with claim 1, wherein said securing means is positioned laterally with respect to the linear alignment of said two main sections.

4. A teaching device in accordance with claim 1, including hand rail means secured to said steps.

5. A teaching device in accordance with claim 1, wherein each step of said one main section is of like chromatic indicia with the step adjacent thereto of said other main section.

6. A teaching device in accordance with claim 1, wherein a first and ninth step, a second and eighth step, third and seventh steps, and fourth and sixth steps respectively have like chromatic indicia.

References Cited by the Examiner

UNITED STATES PATENTS

| 1,894,463 | 1/1933 | Frick | 52—190 |
| 2,479,736 | 8/1949 | Fieroh | 182—132 X |
| 2,635,355 | 4/1953 | Thompson et al. | 35—31.8 |

FOREIGN PATENTS

| 15,518 | 7/1907 | Great Britain. |
| 570,621 | 7/1945 | Great Britain. |
| 239,771 | 2/1946 | Switzerland. |

EUGENE R. CAPOZIO, *Primary Examiner.*

W. GRIEB, *Assistant Examiner.*